(12) United States Patent
Rorex

(10) Patent No.: US 7,089,184 B2
(45) Date of Patent: Aug. 8, 2006

(54) SPEECH RECOGNITION FOR RECOGNIZING SPEAKER-INDEPENDENT, CONTINUOUS SPEECH

(75) Inventor: Phillip G. Rorex, Stevenson Ranch, CA (US)

(73) Assignee: NURV Center Technologies, Inc., Las Vegas, NV (US)

( * ) Notice: Subject to any disclaimer, the term of this patent is extended or adjusted under 35 U.S.C. 154(b) by 538 days.

(21) Appl. No.: 09/813,965

(22) Filed: Mar. 22, 2001

(65) Prior Publication Data

US 2002/0184024 A1 Dec. 5, 2002

(51) Int. Cl.
*G01L 15/28* (2006.01)

(52) U.S. Cl. ...................................... 704/255

(58) Field of Classification Search ................ 704/206, 704/207, 254–255, 216, 260, 258, 253, 267, 704/259, 238, 203, 211, 234, 246, 236, 251, 704/278, 239, 220, 270, 201, 200, 231; 370/210; 707/104.1; 705/17
See application file for complete search history.

(56) References Cited

U.S. PATENT DOCUMENTS

| | | | | |
|---|---|---|---|---|
| 3,592,969 A | * | 7/1971 | Yoshino et al. | 704/234 |
| 3,621,150 A | * | 11/1971 | Pappas | 704/211 |
| 4,181,813 A | * | 1/1980 | Marley | 704/251 |
| 4,284,846 A | * | 8/1981 | Marley | 704/253 |
| 4,313,197 A | * | 1/1982 | Maxemchuk | 370/210 |
| 4,435,831 A | * | 3/1984 | Mozer | 704/267 |
| 4,528,688 A | * | 7/1985 | Ichikawa et al. | 704/239 |
| 4,716,592 A | * | 12/1987 | Ozawa et al. | 704/216 |
| 4,718,087 A | | 1/1988 | Papamichalis | |
| 4,780,906 A | | 10/1988 | Rajasekaran et al. | |
| 4,817,158 A | * | 3/1989 | Picheny | 704/224 |
| 4,829,574 A | * | 5/1989 | Dewhurst et al. | 704/236 |
| 4,852,180 A | | 7/1989 | Levinson | |
| 4,908,865 A | | 3/1990 | Doddington et al. | |
| 4,977,599 A | | 12/1990 | Bahl et al. | |
| 5,058,166 A | * | 10/1991 | Ney et al. | 704/254 |
| 5,097,510 A | * | 3/1992 | Graupe | 704/233 |
| 5,170,432 A | | 12/1992 | Hackbarth et al. | |
| 5,333,236 A | | 7/1994 | Bahl et al. | |
| 5,455,888 A | * | 10/1995 | Iyengar et al. | 704/203 |
| 5,528,725 A | | 6/1996 | Hui | |
| 5,544,049 A | * | 8/1996 | Henderson et al. | 704/7 |
| 5,550,949 A | * | 8/1996 | Takatori et al. | 704/206 |
| 5,555,344 A | | 9/1996 | Zünkler | |

(Continued)

OTHER PUBLICATIONS

Timms et al "Speaker Verification Routines for ISDN And UPT Access and Security using Artificial Neural Networks and Time Encoded Speech (TES) Data", 2nd International Conference on Private Switching Systems and Networks, Jun. 1992).*

(Continued)

*Primary Examiner*—Angela Armstrong
(74) *Attorney, Agent, or Firm*—Rothwell, Figg, Ernst & Manbeck

(57) ABSTRACT

A speech recognition method and apparatus are provided for converting a voice stream into a digital voice stream representation. A method for performing speech recognition on a voice stream according to a first method embodiment includes the steps of determining one or more candidate transnemes in the voice stream, mapping the one or more candidate transnemes to a transneme table to convert the one or more candidate transnemes to one or more found transnemes, and mapping the one or more found transnemes to a transneme-to-vocabulary database to convert the one or more found transnemes to one or more speech units.

73 Claims, 12 Drawing Sheets

U.S. PATENT DOCUMENTS

| | | | |
|---|---|---|---|
| 5,627,939 A | | 5/1997 | Huang et al. |
| 5,666,466 A | * | 9/1997 | Lin et al. .................... 704/246 |
| 5,689,617 A | * | 11/1997 | Pallakoff et al. ............ 704/255 |
| 5,692,103 A | * | 11/1997 | Lockwood et al. ......... 704/233 |
| 5,696,879 A | * | 12/1997 | Cline et al. ................. 704/260 |
| 5,729,657 A | * | 3/1998 | Svensson .................... 704/267 |
| 5,729,694 A | * | 3/1998 | Holzrichter et al. ........ 704/270 |
| 5,729,741 A | * | 3/1998 | Liaguno et al. ............. 704/270 |
| 5,745,873 A | * | 4/1998 | Braida et al. ............... 704/222 |
| 5,751,905 A | * | 5/1998 | Chen et al. ................. 704/254 |
| 5,799,276 A | * | 8/1998 | Komissarchik et al. ..... 704/251 |
| 5,839,099 A | * | 11/1998 | Munsell et al. ............. 704/207 |
| 5,956,685 A | * | 9/1999 | Tenpaku et al. ............ 704/278 |
| 5,970,453 A | * | 10/1999 | Sharman ..................... 704/260 |
| 5,978,764 A | * | 11/1999 | Lowry et al. ............... 704/258 |
| 6,003,004 A | * | 12/1999 | Hershkovits et al. ....... 704/253 |
| 6,032,116 A | * | 2/2000 | Asghar et al. .............. 704/238 |
| 6,073,100 A | * | 6/2000 | Goodridge, Jr. ............ 704/258 |
| 6,138,089 A | * | 10/2000 | Guberman ................. 704/207 |
| 6,304,845 B1 | * | 10/2001 | Hunlich et al. ............. 704/259 |
| 6,510,410 B1 | * | 1/2003 | Chen et al. ................. 704/251 |
| 6,625,576 B1 | * | 9/2003 | Kochanski et al. ......... 704/260 |
| 2002/0029139 A1 | * | 3/2002 | Buth et al. .................. 704/201 |
| 2002/0103646 A1 | * | 8/2002 | Kochanski et al. ......... 704/260 |

OTHER PUBLICATIONS

Jimenez et al ("Some Results With A Trainable Speech Translation And Understanding System", International Conference on Acoustics, Speech, and Signal Processing, May 1995).*

Li et al ("Bi-Level Video: Video Communication At Very Low Bit Rates", Proceedings of the 9th ACM international conference o Multimedia, Oct. 2001).*

Neng-Huang et al ("Prosody Model in a Mandarin Text-To-Speech System Based on a Hierarchical Approach", IEEE International Conference on Multimedia, Jul. 2000).*

* cited by examiner

TIME = T$_1$

TIME = T$_2$

US 7,089,184 B2

SPEECH RECOGNITION FOR RECOGNIZING SPEAKER-INDEPENDENT, CONTINUOUS SPEECH

BACKGROUND OF THE INVENTION

1. Field of the Invention

The present invention relates generally to speech recognition, and more particularly to real-time speech recognition for recognizing speaker-independent, connected or continuous speech.

2. Description of the Background Art

Speech recognition refers to the ability of a machine or device to receive, analyze and recognize human speech. Speech recognition is also often referred to as voice recognition. Speech recognition may potentially allow humans to interface with machines and devices in an easy, quick, productive and reliable manner. Accurate and reliable speech recognition is therefore highly sought after.

Speech recognition gives humans the capability of verbally generating documents, recording or transcribing speech, and audibly controlling devices. Speech recognition is desirable because speech occurs at a much faster rate than manual operations, such as typing on a keyboard or operating controls. A good typist can type about 80 words per minute, while typical speech can be in the range of about 200 or more words per minute.

In addition, speech recognition can allow remote control of electronic devices. Many applications exist for impaired persons who cannot operate conventional devices, such as persons who are at least partially paralyzed, blind, or medicated. For example, a computer or computer operated appliances could be speech controlled.

Moreover, speech recognition may be used for hands-free operation of conventional devices. For example, one current application is the use of speech recognition for operating a cellular phone, such as in a vehicle. This may be desirable because the driver's attention should stay on the road.

Speech recognition processes and speech recognition devices currently exist. However, there are several difficulties that have prevented speech recognition from becoming practical and widely available. The main obstacle has been the wide variations in speech between persons. Different speakers have different speech characteristics, making speech recognition difficult or at best not satisfactorily reliable. For example, useful speech recognition must be able to identify not only words but also small word variations. Speech recognition must be able to differentiate between homonyms by using context. Speech recognition must be able to recognize silence, such as gaps between words. This may be difficult if the speaker is speaking rapidly and running words together. Speech recognition systems may have difficulty adjusting to changes in the pace of speech, changes in speech volume, and may be frustrated by accents or brogues that affect the speech.

Speech recognition technology has existed for some time in the prior art, and has become fairly reasonable in price. However, it has not yet achieved satisfactory reliability and is not therefore widely used. For example, as previously mentioned, devices and methods currently exist that capture and convert the speech into text, but generally require extensive training and make too many mistakes.

FIG. 1 shows a representative audio signal in a time domain. The audio signal is generated by capture and conversion of an audio stream into an electronic voice stream signal, usually through a microphone or other sound transducer. Generally, audible sound exists in the range of about 20 hertz (cycles) to about 20 kilohertz (kHz). Speech is a smaller subset of frequencies. The electronic voice stream signal may be filtered and amplified and is generally digitized for processing.

FIG. 2 shows the voice stream after it has been converted from the time domain into the frequency domain. Conversion to the frequency domain offers advantages over the time domain. Human speech is generated by the mouth and the throat, and contains many different harmonics (it is generally not composed of a single component frequency). The audible speech signal of FIG. 2, therefore, is composed of many different frequency components at different amplitude levels. In the frequency domain, the speech recognition device may be able to more easily analyze the voice stream and detect meaning based on the frequency components of the voice stream.

FIG. 3 shows how the digitized frequency domain response may be digitally represented and stored. Each digital level may represent a frequency or band of frequencies. For example, if the input voice stream is in the range of 1 kilohertz (kHz) to 10 kHz, and is separated into 128 frequency spectrum bands, each band (and corresponding frequency bin) would contain a digital value or amplitude for about 70 Hz of the speech frequency spectrum. This value may be varied in order to accommodate different portions of the audible sound spectrum. Speech does not typically employ all of the frequencies in the audible frequency range of 20 Hz to 20 kHz. Therefore, a speech recognition device may analyze only the frequencies from 1 kHz to 10 kHz, for example.

Once the voice stream has been converted to the frequency domain, an iterative statistical look-up may be performed to determine the parts of speech in a vocalization. The parts are called phonemes, the smallest unit of sound in any particular language. Various languages use phonemes that are not utilized in any other language. The English language designates about 34 different phonemes. The iterative statistical look-up employed by the prior art usually uses hidden Markov modeling (HMM) to statistically compare and determine the phonemes. The iterative statistical look-up compares multiple portions of the voice stream to stored phonemes in order to try to find a match. This generally requires multiple comparisons between a digitized sample and a phoneme database and a high computational workload. Therefore, by finding these phonemes, the speech recognition device can create a digital voice stream representation that represents the original vocalizations in a digital, machine-usable form.

The main difficulty encountered in the prior art is that different speakers speak at different rates and therefore the phonemes may be stretched out or compressed. There is no standard length phoneme that a speech recognition device can look for. Therefore, during the comparison process, these time-scale differences must be compensated for.

In the prior art, the time-scale differences are compensated for by using one of two approaches. In the dynamic time warping process, a statistical modeling stretches or compresses the wave form in order to find a best fit match of a digitized voice stream segment to a set of stored spectral patterns or templates. The dynamic time warping process uses a procedure that dynamically alters the time dimension to minimize the accumulated distance score for each template.

In a second prior art approach, the hidden Markov model (HMM) method characterizes speech as a plurality of statistical chains. The HMM method creates a statistical, finite-state Markov chain for each vocabulary word while it trains the data. The HMM method then computes the probability of generating the state sequence for each vocabulary word. The word with the highest accumulated probability is selected as the correct identification. Under The HMM method, time alignment is obtained indirectly through the sequence of states.

The prior art speech recognition approaches have drawbacks. One drawback is that the prior art approach is not sufficiently accurate due to the many variations between speakers. The prior art speech recognition suffers from mistakes and may produce an output that does not quite match.

Another drawback is that the prior art method is computationally intensive. Both the dynamic time warping approach and the HMM statistical approach require many comparisons in order to find a match and many iterations in order to temporally stretch or compress the digitized voice stream sample to fit samples in the phoneme database.

There have been many attempts in the prior art to increase speech recognition accuracy and/or to decrease computational time. One way of somewhat reducing computational requirements and increasing accuracy is to limit the library of phonemes and/or words to a small set and ignore all utterances not in the library. This is acceptable for applications requiring only limited speech recognition capability, such as operating a phone where only a limited number of vocal commands are needed. However, it is not acceptable for general uses that require a large vocabulary (i.e., normal conversational speech).

Another prior art approach is a speaker-dependent speech recognition wherein the speech recognition device is trained to a particular person's voice. Therefore, only the particular speaker is recognized, and that speaker must go through a training or "enrollment" process of reading or inputting a particular speech into the speech recognition device. A higher accuracy is achieved without increased cost or increased computational time. The drawback is that use of speaker-dependent voice recognition is limited to one person, requires lengthy training periods, may require a lot of computation cycles, and is limited to only applications where the speaker's identity is known a priori.

What is needed, therefore, are improvements in speech recognition technology.

SUMMARY OF THE INVENTION

A speech recognition device is provided according to one embodiment of the invention. The speech recognition device comprises an I/O device for accepting a voice stream and a frequency domain converter communicating with the I/O device. The frequency domain converter converts the voice stream from a time domain to a frequency domain and generates a plurality of frequency domain outputs. The speech recognition device further comprises a frequency domain output storage communicating with the frequency domain converter. The frequency domain output storage comprises at least two frequency spectrum frame storages for storing at least a current frequency spectrum frame and a previous frequency spectrum frame. A frequency spectrum frame storage of the at least two frequency spectrum frame storages comprises a plurality of frequency bins storing the plurality of frequency domain outputs. The speech recognition device further comprises a processor communicating with the plurality of frequency bins and a memory communicating with the processor. A frequency spectrum difference storage in the memory stores one or more frequency spectrum differences calculated as a difference between the current frequency spectrum frame and the previous frequency spectrum frame. At least one feature storage is included in the memory for storing at least one feature extracted from the voice stream. At least one transneme table is included in the memory, with the at least one transneme table including a plurality of transneme table entries and with a transneme table entry of the plurality of transneme table entries mapping a predetermined frequency spectrum difference to at least one predetermined transneme of a predetermined verbal language. At least one mappings storage is included in the memory, with the at least one mappings storage storing one or more found transnemes. At least one transneme-to-vocabulary database is included in the memory, with the at least one transneme-to-vocabulary database mapping a set of one or more found transnemes to at least one speech unit of the predetermined verbal language. At least one voice stream representation storage is included in the memory, with the at least one voice stream representation storage storing a voice stream representation created from the one or more found transnemes. The speech recognition device calculates a frequency spectrum difference between a current frequency spectrum frame and a previous frequency spectrum frame, maps the frequency spectrum difference to a transneme table, and converts the frequency spectrum difference to a transneme if the frequency spectrum difference is greater than a predetermined difference threshold. The speech recognition device creates a digital voice stream representation of the voice stream from one or more transnemes thus produced.

A method for performing speech recognition on a voice stream is provided according to a first method embodiment of the invention. The method comprises the steps of determining one or more candidate transnemes in the voice stream, mapping the one or more candidate transnemes to a transneme table to convert the one or more candidate transnemes to one or more found transnemes, and mapping the one or more found transnemes to a transneme-to-vocabulary database to convert the one or more found transnemes to one or more speech units.

A method for performing speech recognition on a voice stream is provided according to a second method embodiment of the invention. The method comprises the step of calculating a frequency spectrum difference between a current frequency spectrum frame and a previous frequency spectrum frame. The current frequency spectrum frame and the previous frequency spectrum frame are in a frequency domain and are separated by a predetermined time interval. The method further comprises the step of mapping the frequency spectrum difference to a transneme table to convert the frequency spectrum difference to at least one transneme if the frequency spectrum difference is greater than a predetermined difference threshold. A digital voice stream representation of the voice stream is created from one or more transnemes thus produced.

A method for performing speech recognition on a voice stream is provided according to a third method embodiment of the invention. The method comprises the step of performing a frequency domain transformation on the voice stream upon a predetermined time interval to create a current frequency spectrum frame. The method further comprises the step of normalizing the current frequency spectrum frame. The method further comprises the step of calculating a frequency spectrum difference between the current frequency spectrum frame and a previous frequency spectrum frame. The method further comprises the step of mapping the frequency spectrum difference to a transneme table to convert the frequency spectrum difference to at least one found transneme if the frequency spectrum difference is greater than a predetermined difference threshold. The method therefore creates a digital voice stream representation of the voice stream from one or more found transnemes thus produced.

The above and other features and advantages of the present invention will be further understood from the following description of the preferred embodiments thereof, taken in conjunction with the accompanying drawings.

DETAILED DESCRIPTION OF THE PREFERRED EMBODIMENTS

Figure 4:
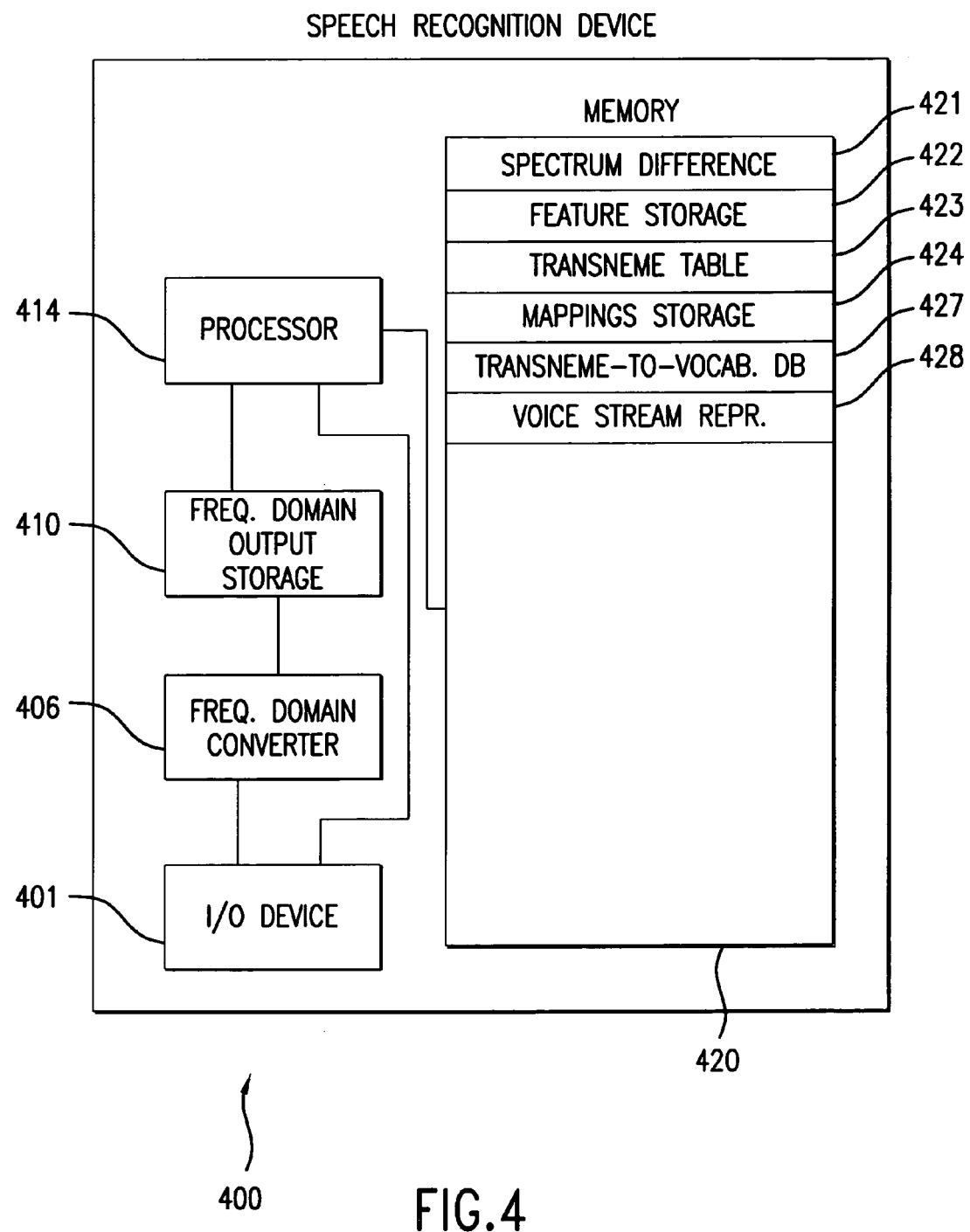
FIG. 4 shows a speech recognition device according to one embodiment of the invention.

FIG. 4 shows a speech recognition device 400 according to one embodiment of the invention. The speech recognition device 400 includes an input/output (I/O) device 401, a frequency domain converter 406, frequency domain output storage 410, a processor 414, and a memory 420.

The speech recognition device 400 of the invention performs speech recognition and converts a voice stream input into a digital voice stream representation. The voice stream representation comprises a series of symbols that digitally represents the voice stream and may be used to recreate the voice stream.

The speech recognition is accomplished by finding transnemes in the voice stream and converting the found transnemes into speech units of a predetermined verbal language. A speech unit may be a word, a portion of a word, a phrase, an expression, or any other type of verbal utterance that has an understood meaning in the predetermined verbal language.

A phoneme is generally described as being the smallest unit of sound in any particular language. Each vocalized phoneme is a distinct sound and therefore may be characterized by a substantially unique frequency domain response, substantially over the duration of the vocalization of the phoneme. In the English language, it is generally accepted that there are about 34 phonemes that are used to create all parts of the spoken language. There are less than 100 identified phonemes in all languages combined.

A transneme is defined herein as a transition between the phoneme (or allophone) components of human speech. There are approximately 10,000 transnemes. Transnemes are therefore smaller subunits or components of speech, and are used by the Invention to produce a speech recognition that is speaker-independent and that operates on connected speech (i.e., the speaker can talk normally and does not have to take care to voice each word separately and distinctly).

The speech recognition of the invention does not attempt to find and identify phonemes, as is done in the prior art. Instead, the speech recognition device 400 searches for transitions between and within phonemes (i.e., transnemes), with such transitions generally being shorter in duration than phonemes. Moreover, because a transneme is defined by two temporally adjacent phonemes or parts of phonemes, the number of transnemes is approximately equal to the square of the number of phonemes (i.e., 100×100=10,000). Identification of the transneme components of speech therefore achieves a greater efficiency, accuracy, and resolution than the various speech recognition techniques of the prior art.

The I/O device 401 may be any type of device that is capable of accepting an audio signal input that includes a voice stream. The I/O device 401 provides the audio signal input to the speech recognition device 400. The I/O device 401 may accept a digitized voice stream or may include a digitizer, such as an analog to digital converter (not shown) if the incoming audio signal is in analog form. The I/O device 401 may accept a voice stream that is already compressed or that has already been converted into the frequency domain.

The I/O device 401 may be any type of input device, including a microphone or sound transducer, or some other form of interface device. The I/O device 401 may additionally be a radio frequency receiver or transceiver, such as a radio frequency front-end, including an antenna, amplifiers, filters, down converters, etc., that produce an audio signal. This may include any type of radio receiver, such as a cell phone, satellite phone, pager, one or two-way radios, etc. Furthermore, the I/O device 401 may be a TV receiver, an infrared receiver, an ultrasonic receiver, etc. Alternatively, the I/O device 401 may be an interface, such as an interface to a digital computer network, such as the Internet, a local area network (LAN), etc., may be an interface to an analog network, such as an analog telephone network, etc.

In addition to accepting a voice stream, the I/O device 401 may be capable of outputting a voice stream representation. For example, the speech recognition may be used to compress the voice stream for transmission to another device. For example, the speech recognition of the invention may be used in a cell phone. The voice stream (or other sound input) may be received by the I/O device 401 and may be converted into text or speech representation symbols by the speech recognition device 400. The speech representation symbols may then be transmitted to a remote location or device by the I/O device 401. At the receiving device, the speech representation symbols may be converted back into an audio output. This use of the invention for audio compression greatly reduces bandwidth requirements of the speech transmission.

Figure 1:
FIG. 1 shows a representative audio signal in a time domain.
Figure 2:
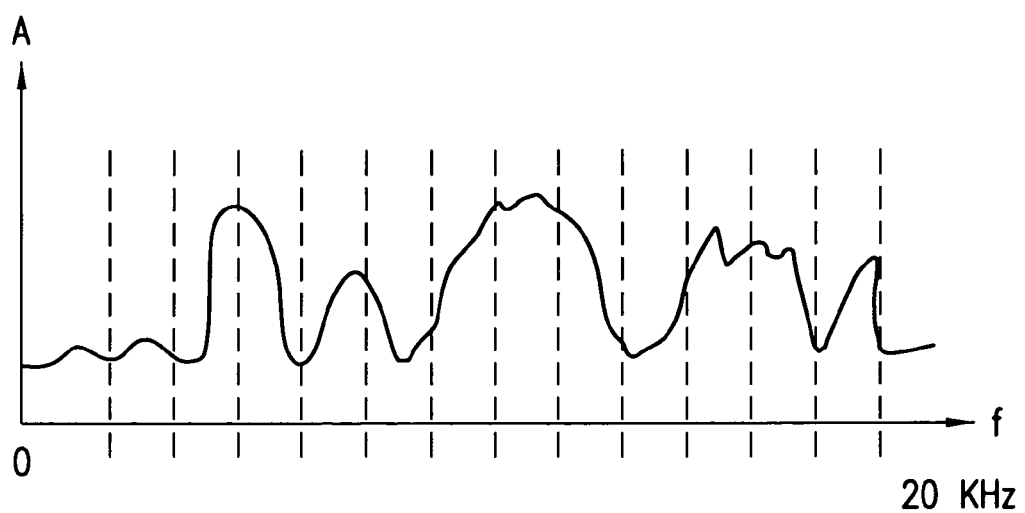
FIG. 2 shows the voice stream after it has been converted from the time domain into the frequency domain.
Figure 3:
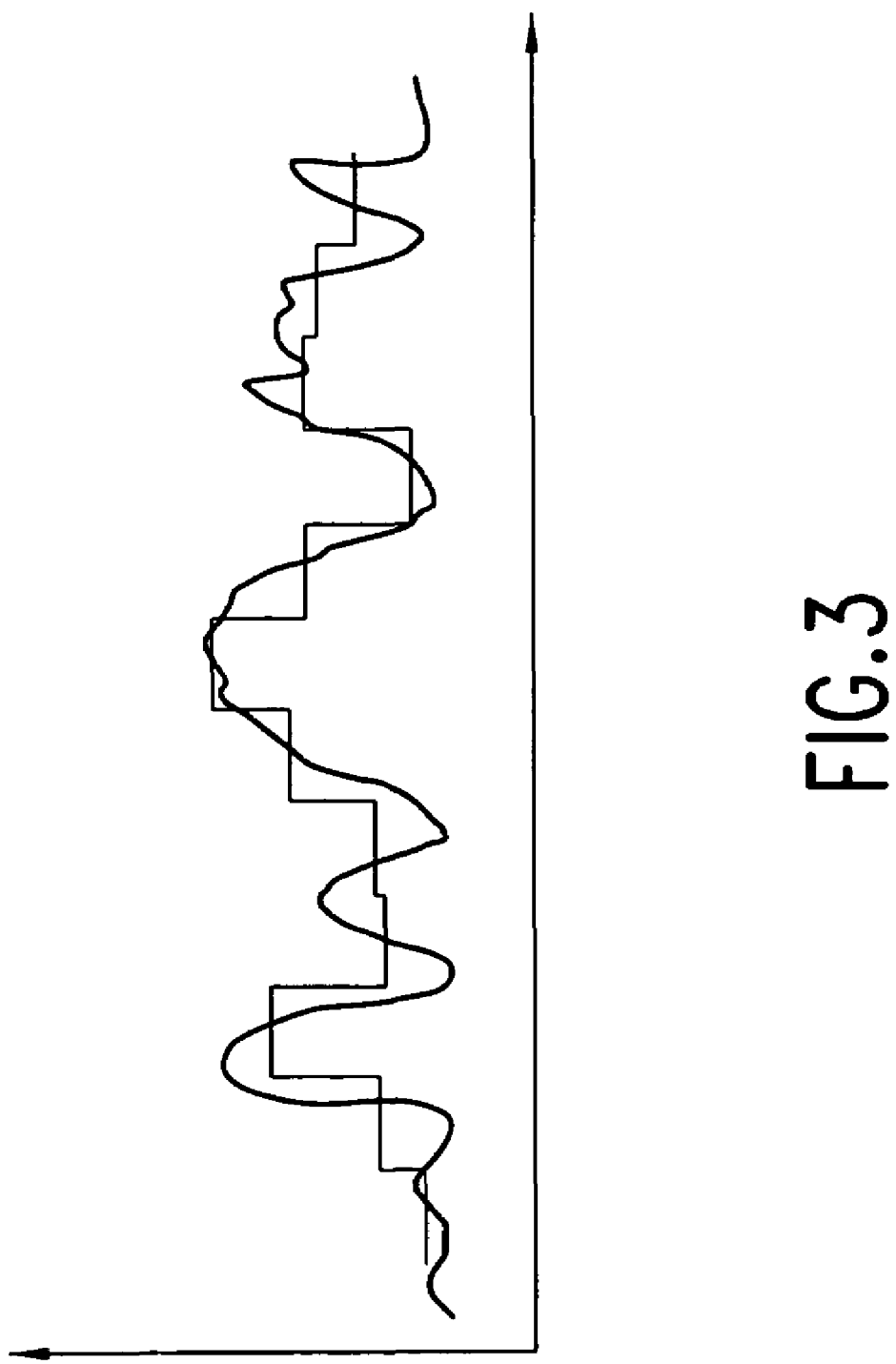
FIG. 3 shows how the digitized frequency domain response may be digitally represented and stored.

The frequency domain converter 406 communicates with the I/O device 401 and converts the incoming voice stream signal into a frequency domain signal (See FIGS. 2 and 3). The frequency domain converter 406 may be, for example, a discrete Fourier transform device or a fast Fourier transform device (FFT) that performs a Fourier transform on the time domain voice stream. Alternatively, the frequency domain converter 406 may be a filter bank employing a plurality of filters, such as band pass filters that provide a frequency spectrum output, or may be a predictive coder.

The frequency domain converter 406 generates a plurality of outputs, with each output representing a predetermined frequency or frequency band. The plurality of outputs of the frequency domain conversion are referred to herein as a frequency spectrum frame, with a frequency spectrum frame comprising a plurality of amplitude values that represent the frequency components of the voice stream over the predetermined frequency conversion window period (see FIG. 10, for example, and also see the discussion accompanying FIG. 13). The number of outputs may be chosen according to a desired frequency band size and according to a range of audible frequencies desired to be analyzed. In one embodiment, the frequency domain converter 406 generates 128 outputs for a predetermined frequency domain conversion window.

Figure 5:
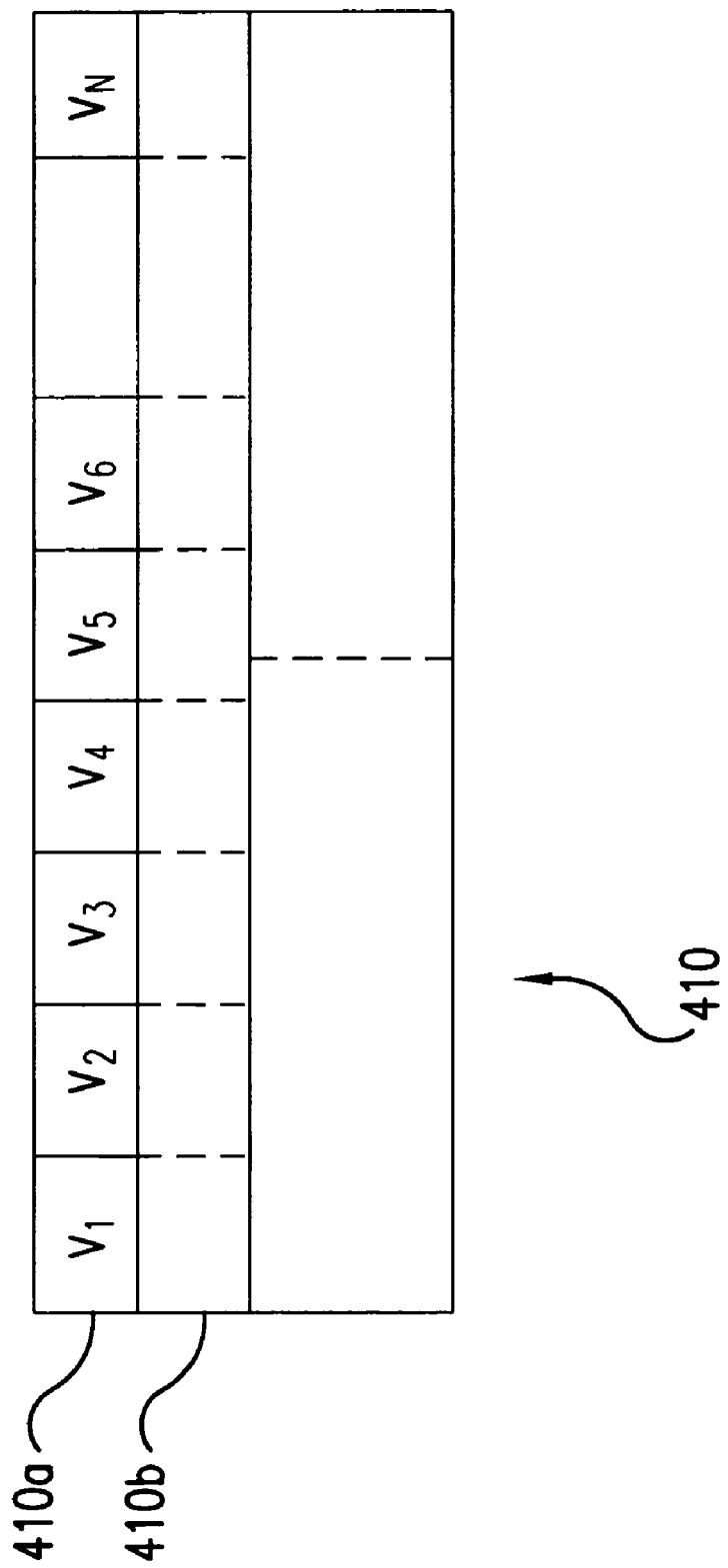
FIG. 5 shows detail of a frequency domain output storage.

FIG. 5 shows detail of the frequency domain output storage 410. The frequency domain output storage 410 communicates with the frequency domain converter 406. The frequency domain output storage 410 is a memory that comprises at least two frequency spectrum frames 410a and 410b. Alternatively, the frequency domain output storage 410 may be eliminated and the plurality of outputs from the frequency domain converter 406 may be stored in the memory 420.

Each frequency spectrum frame 410a, 410b, etc., stores a set of digital values $V_1$–$V_N$ that represents the amplitudes or quantities of frequency band components present in the voice stream over the predetermined frequency conversion window. Each frame contains N bins, with N corresponding to the number of frequency domain transformation outputs generated by the frequency domain converter 406. Each bin therefore contains a frequency domain conversion output value V. The sets of digital values $V_1$–$V_N$ in successive frequency spectrum frames, such as those in frames 410a and 410b, may be analyzed in order to process the input voice stream.

The processor 414 may be any type of processor, and communicates with the frequency domain output storage 410 in order to receive the frequency spectrum frame or frames contained within the frequency domain output storage 410. The processor 414 is also connected to the memory 420 and is optionally connected to the I/O device 401 whereby the processor may receive a digitized time domain signal. The processor 414 may be connected to the I/O device 401 in order to extract features from the time domain signal, such as pitch and volume features. These speech features may be used for adding punctuation, emphasis, etc., to the voice stream representation output, for example, and may also be used to normalize the frequency spectrum frames (the normalization is discussed below in the text accompanying FIGS. 14–18).

The memory 420 communicates with the processor 414 and may be any type of storage device, including types of random access memory (RAM), types of read-only memory (ROM), magnetic tape or disc, bubble memory, optical memory, etc. The memory 420 may be used to store an operating program that includes a speech recognition algorithm according to various aspects of the invention. In addition, the memory 420 may include variables and data used to process the speech and may hold temporary values during processing. The memory 420, therefore, may include a spectrum difference storage 421, a feature storage 422, at least one transneme table 423, at least one mappings storage 424, at least one transneme-to-vocabulary database 427, and at least one voice stream representation 428. The memory 420 may optionally include a frequency spectrum frame storage (not shown) for storing one or more frequency spectrum frames, such as the output of the frequency domain converter 406.

The spectrum difference storage 421 stores at least one frequency spectrum difference calculated from current and previous frequency spectrum frames. The frequency spectrum difference, therefore, is a set of values that represents a change in spectral properties of the voice stream.

The feature storage 422 contains at least one feature extracted from the voice stream, such as a volume or pitch feature, for example. The feature may have been obtained from the voice stream in either the time domain or the frequency domain. Data stored in the feature storage 422 may be used to normalize a frequency spectrum frame and to aid in grammar interpretation such as by adding punctuation. In addition, the features may be used to provide context when matching a found transneme to speech units, words, or phrases.

The at least one transneme table 423 contains a plurality of transnemes. Transnemes are used to analyze the input voice stream and are used to determine the parts of speech therein in order to create a voice stream representation in digital form. For example, the phrase, "Hello, World" is made up of 11 transnemes ("[]" represents silence). If smaller frame sizes are utilized, transnemes can be smaller parts of phonemes, with multiple transnemes per phoneme.

[]—H
H—E
E—L
L—OW
OW—[]
[]—W
W—EH
EH—R
R—L
L—D
D—[]

Transnemes are dictated by the sounds produced by the human vocal apparatus. Therefore, transnemes are essentially independent of the verbal language of the speaker. However, a particular language may only contain a subset of all of the existing transnemes. As a result, the transneme table 423 may contain only the transnemes necessary for a predetermined verbal language. This may be done in order to conserve memory space. In applications where language translation or speech recognition of multiple verbal languages is required, the transneme table may likely contain the entire set of transnemes.

The mappings storage 424 stores one or more mappings produced by comparing one or more frequency spectrum differences to at least one transneme table 423. In other words, when transnemes are found through the matching process, they are accumulated in the mappings storage 424.

The transneme-to-vocabulary database 427 maps found transnemes to one or more speech units, with a speech unit being a word, a portion of a word (e.g. a syllable), a phrase, or any utterance that has a defined meaning. By using the transneme-to-vocabulary database 427, the speech recognition device 400 may compare groupings of one or more found transnemes to the transneme-to-vocabulary database 427 in order to find speech units and create words and phrases.

The transneme-to-vocabulary database 427 may contain entries that map transnemes to one or more verbal languages, and may therefore convert transnemes into speech units of one or more predetermined verbal languages. In addition, the speech recognition device 400 may include multiple transneme-to-vocabulary databases 427, with additional transneme-to-vocabulary databases 427 capable of being added to give additional speech recognition capability in other languages.

The voice stream representation storage 428 is used to store found words and phrases as part of the creation of a voice stream representation. For example, the voice stream representation 428 may accumulate a series of symbols, such as text, that have been constructed from the voice stream input.

The speech recognition device 400 is speaker-independent and reliably processes and converts connected speech (connected speech is verbalized without any concern or effort to separate the words or talk in any specific manner in order to aid in speech recognition). The speech recognition device 400 therefore operates on connected speech in that it can discern breaks between words and/or phrases and without excessive computational requirements. A reduced computational workload may translate to simpler and less expensive hardware.

Another difference between the invention and the prior art is that gaps or silences between phonemes are detected and removed by the frequency spectrum differences. If a spectrum difference evaluates to be approximately zero, that means that the spectrum frame has not changed appreciably since the last frequency domain transformation. Therefore, a transition from one phoneme to another (i.e., a transneme) has not occurred and as a result the particular time sample may be ignored.

The use of frequency spectrum frame differencing eliminates the need for the complex and inefficient dynamic time warping procedure of the prior art, and therefore generally requires only about one cycle per comparison of a spectrum difference to a database or table. Therefore, unlike the prior art dynamic time warping and statistical modeling, the speech recognition device 400 of the present invention does not need to perform a large amount of comparisons in order to account for time variations in the voice stream.

The speech recognition device 400 may be a specialized device constructed for speech recognition or may be integrated into another electronic device. The speech recognition device 400 may be integrated into any manner of electronic device, including cell phones, satellite phones, conventional land-line telephones (digital and analog), radios (one and two-way), pagers, personal digital assistants (PDAs), laptop and desktop computers, mainframes, digital network appliances and workstations, etc. Alternatively, the speech recognition device 400 may be integrated into specialized controllers or general purpose computers by implementing software to perform speech recognition according to the present invention. Speech recognition and control may therefore be added to personal computers, automobiles and other vehicles, factory equipment and automation, robotics, security devices, etc.

Figure 6:
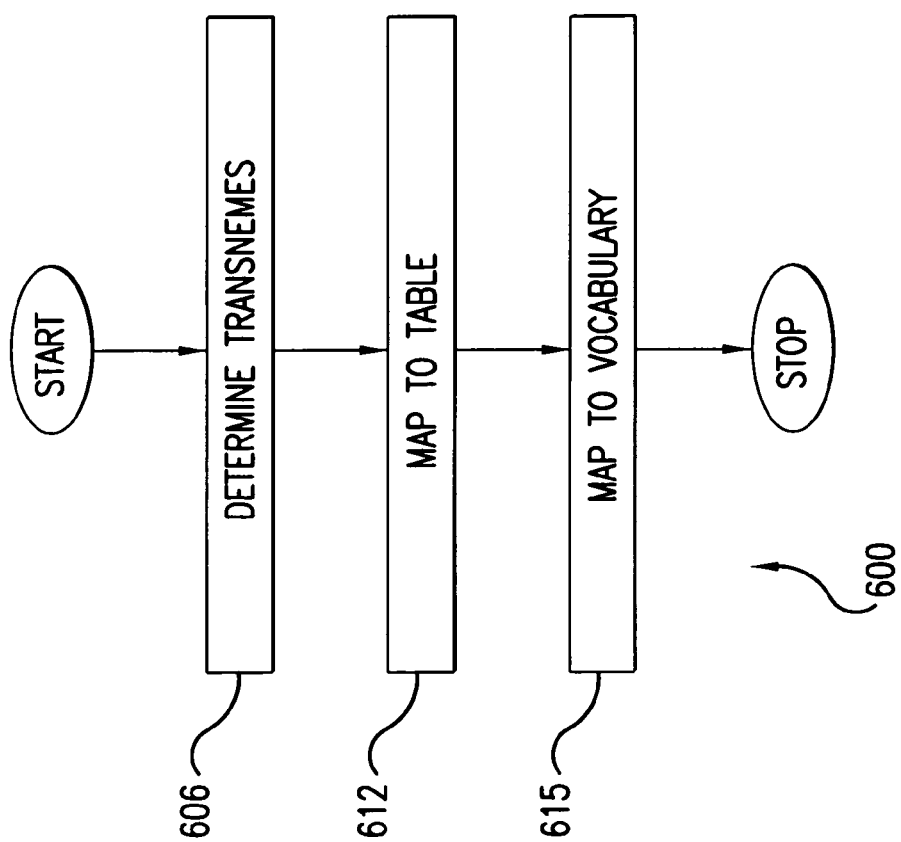
FIG. 6 is a flowchart of a first speech recognition method embodiment according to the invention.

FIG. 6 is a flowchart 600 of a first speech recognition method embodiment according to the invention. In step 606, the method determines one or more candidate transnemes in a voice stream. This is accomplished by analyzing the voice stream in a frequency domain and comparing frequency spectrum frames (captured over predetermined time periods) in order to determine one or more candidate transnemes. The frequency spectrum frames may be obtained for overlapping time periods (windows).

As previously described, a transneme is a transition between phonemes or allophones, and a candidate transneme may be determined by finding a significant spectrum variation in the frequency domain. Therefore, a comparison in the frequency domain may be performed between a current frequency spectrum frame (containing frequency components of predetermined frequencies or frequency bands) to a previous frequency spectrum frame in order to determine voice stream frequency changes over time. Periods of silence or periods of substantially no frequency change are ignored.

The I/O device 401 passes a digitized voice stream to the frequency domain converter 406 and to the processor 414. The processor 414 may extract predetermined speech features from the digitized time domain voice stream. These predetermined speech features may be used to add punctuation and may also be used to normalize the frequency spectrum frames based on a detected volume and pitch of the speaker. For example, a tonality rise by the speaker may signify a question or query, signifying a question mark or other appropriate punctuation in the completed voice stream representation.

The frequency domain converter 406 converts the digitized voice stream into a plurality of frequency domain signal outputs and stores them in the frequency domain output storage 410. The frequency domain converter 406 is preferably a Fourier transform device that performs Fourier transforms on the digitized input voice stream. The outputs are preferably in the form of an array of values representing the different frequency bands present in the voice stream. Alternatively, the frequency domain converter 406 may be any other device that is capable of converting the time domain signal into the frequency domain, such as a filter bank comprising a plurality of filters, such as band pass filters, for example.

Figure 7:
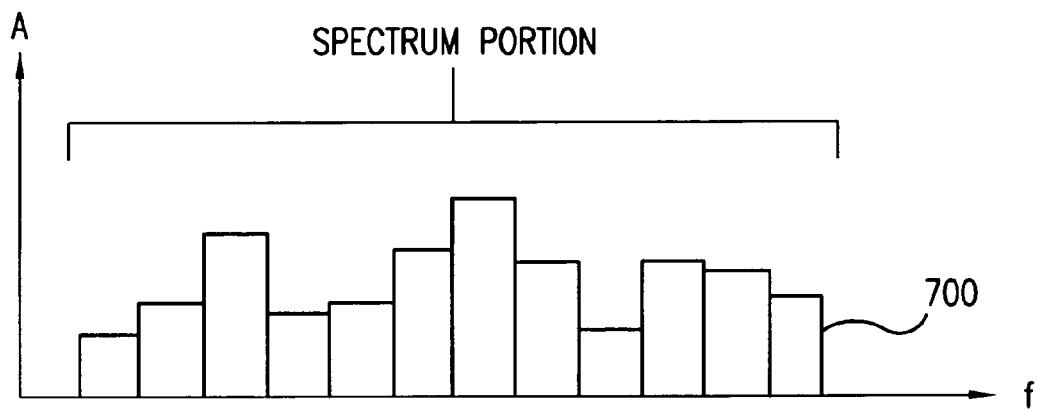
FIG. 7 shows a frequency spectrum frame according to a first embodiment of a frequency domain conversion.

FIG. 7 shows a frequency spectrum frame 700 according to a first embodiment of the frequency domain conversion. In the first embodiment, the frequency spectrum frame 700 comprises a plurality of contiguous frequency bands that substantially covers a predetermined portion of the audible frequency spectrum.

Figure 8:
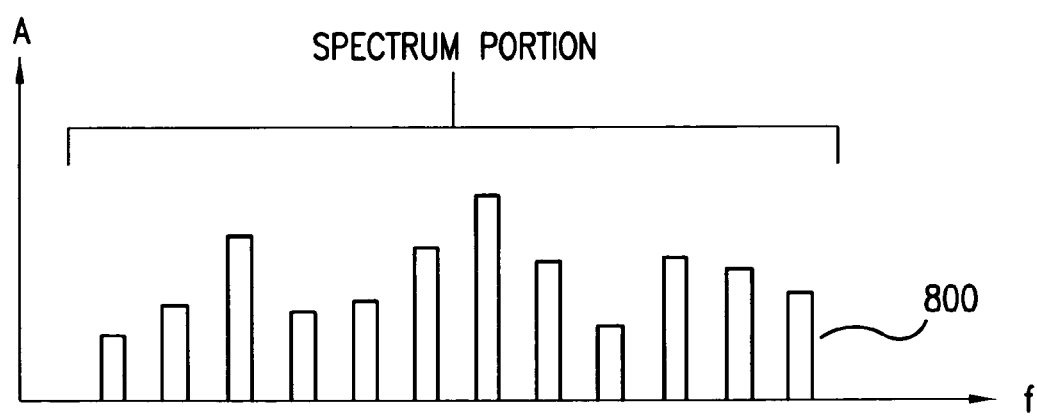
FIG. 8 shows a frequency spectrum frame according to a second embodiment of the frequency domain conversion.

FIG. 8 shows a frequency spectrum frame 800 according to a second embodiment of the frequency domain conversion. In the second embodiment, the frequency spectrum frame 800 comprises a plurality of substantially individual frequencies or a plurality of non-contiguous frequency bands. Although some of the frequencies in the predetermined portion of the audible frequency spectrum are ignored, the frame 800 may still adequately reflect and characterize the various frequency components of the voice stream. By using only portions of the predetermined portion of the audible frequency spectrum and not using contiguous frequency bands, the amount of data processed in comparing frequency spectrum characteristics and finding transnemes may be further reduced. The result is a decrease in computational processing requirements and storage requirements.

As a further part of determining a transneme, the processor 414 accesses the frequency domain outputs in the frequency domain output storage 410 and creates a frequency spectrum difference. When a frequency spectrum difference evaluates to be non-zero, a transition between phonemes has occurred and the frequency spectrum difference has been used to determine a candidate transneme in the input voice stream.

In step 612, a candidate transneme is mapped to the transneme table 423 (or other data conversion device) in order to determine whether it is a valid transneme. By using one or more transneme tables 423, a candidate transneme (i.e., a valid frequency spectrum difference) is converted into a found transneme.

In step 615, the found transneme is mapped to at least one transneme-to-vocabulary database 427 (or other data conversion device) and are converted to one or more speech units. The speech units may comprise words, portions of words, phrases, or any other utterance that has a recognized meaning.

The method 600 therefore converts the voice stream (or other audio input) into a digital voice stream representation. The digital voice stream representation produced by the speech recognition comprises a series of digital symbols, such as text, for example, that may be used to represent the voice stream. The voice stream representation may be stored or may be used or processed in some manner.

Speech recognition according to the invention has many uses. The speech recognition of the invention converts a voice stream input into a series of digital symbols that may be used for speech-to-text conversion, to generate commands and inputs for voice control, etc. This may encompass a broad range of applications, such as dictation, transcription, messaging, etc. The speech recognition of the invention may also encompass voice control, and may be incorporated into any type of electronic device or electronically controlled device. Furthermore, the speech recognition of the invention may analyze any type of non-speech audio input and convert it to a digital representation if an equivalent set of transneme definitions is known. For example, the speech recognition method could find possible applications in music.

The speech recognition of the invention may additionally be used to perform a highly effective compression on the voice stream. This is accomplished by converting the voice stream into a voice stream representation comprising a series of symbols. Due to the highly efficient and relatively simple conversion of the voice stream into digital symbols (such as numerical codes, including, for example, ASCII symbols for English letters and punctuation), the speech recognition of the invention may provide a highly effective audio signal compression.

Digitally captured and transmitted speech typically contains only frequencies in the 4 kHz to 10 kHz range and requires a data transmission rate of about 12 kbits per second. However, employing the speech recognition of the invention, speech may be transmitted at a data rate of about 120 bits per second to about 60 bits per second. The result is a data compression of about 100 to 1 to about 200 to 1. This allows a device to decrease its data rate and hardware requirements while simultaneously allowing greater transmission quality (i.e., by capturing more of the 20 Hz to 20 kHz audible sound spectrum).

The voice stream compression may be advantageously used in a variety of ways. One application may be to compress a voice stream for transmission. This may include wireless transmission of the voice stream representation, such as a radio transmission, an infrared (IR) or optical transmission, an ultrasonic transmission, etc. The voice stream compression may therefore be highly useful in communication devices such as cellular phones, satellite phones, pagers, radios, etc. Alternatively, the transmission may be performed over some form of transmission media, such as wire, cable, optical fiber, etc. Therefore, the voice stream representation may be used to more efficiently communicate data over conventional analog telephone networks, digital telephone networks, digital packet networks, computer networks, etc.

Another compression application may be the use of speech recognition to compress data for manipulation and storage. A voice stream may be converted into a series of digital symbols in order to drastically reduce storage space requirements. This may find advantageous application in areas such as answering machines, voice messaging, voice control of devices, etc.

In yet another application, by including an appropriate transneme-to-vocabulary table or tables 427, the speech recognition may perform a language translation function. The speech recognition device 400 may receive a voice stream of a first verbal language and, through use of an appropriate transneme-to-vocabulary table or tables 427, may convert that voice stream into a voice stream representation of a second language.

Figure 9:
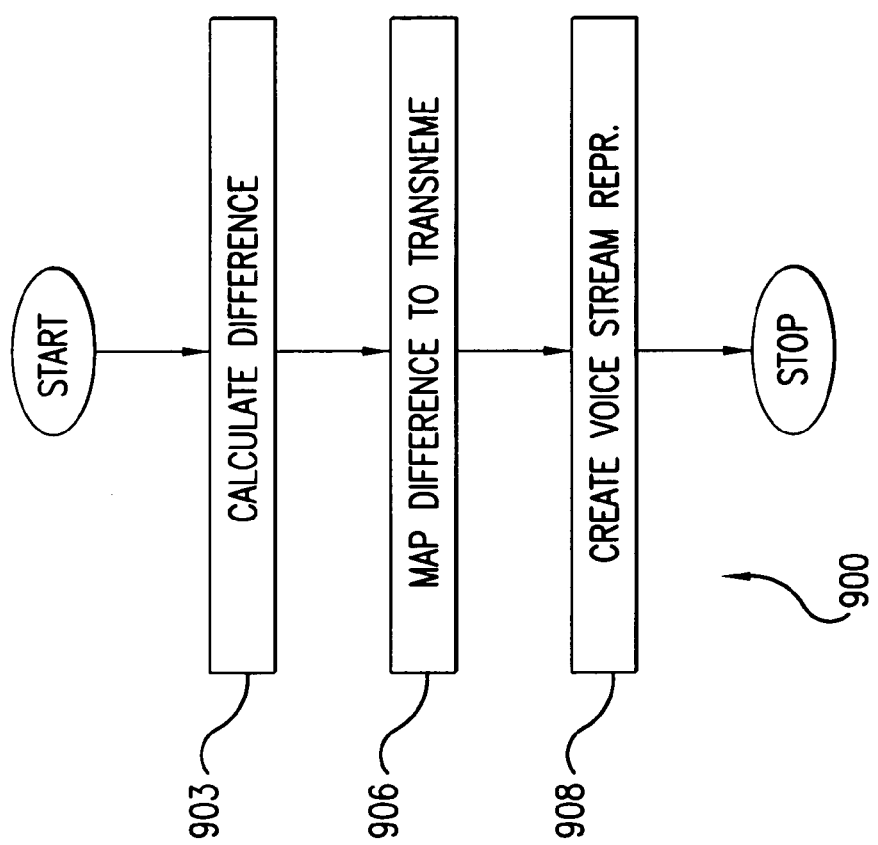
FIG. 9 is a flowchart of a second speech recognition method embodiment.

FIG. 9 is a flowchart 900 of a second speech recognition method embodiment according to the invention. In step 903, a frequency spectrum difference is calculated. The frequency spectrum difference is calculated between two frequency spectrum frames in order to determine whether a transneme has occurred. The voice stream must have already been processed in some manner in order to create a frequency domain signal or representation. This may also include pre-processing such as amplification, filtering, and digitization.

Figure 10:
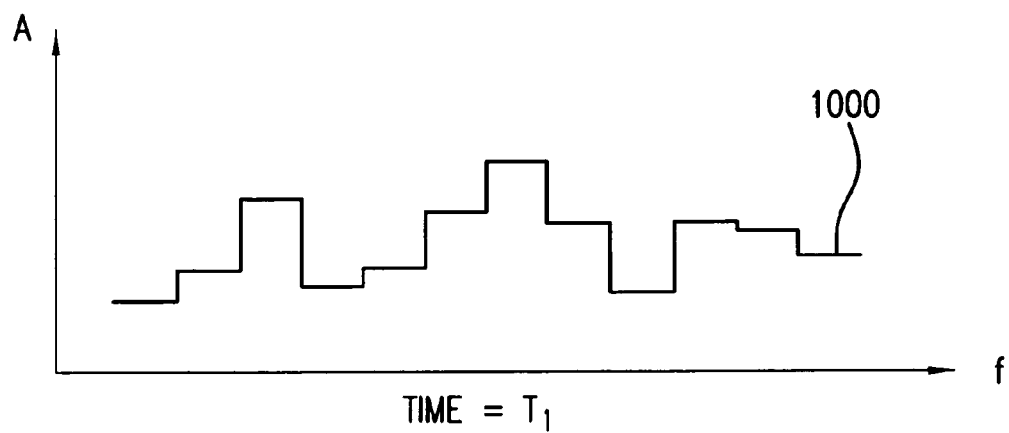
FIG. 10 shows a first frequency spectrum frame obtained at a first point in time.
Figure 11:
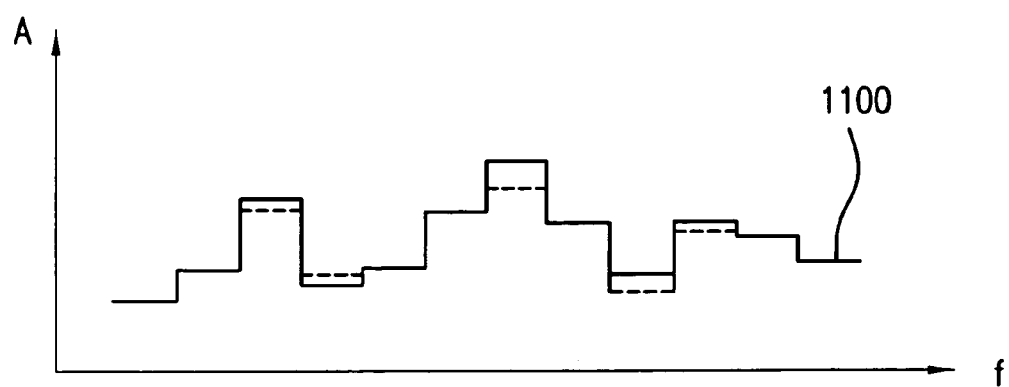
FIG. 11 shows a second frequency spectrum frame obtained at a second point in time.

FIG. 10 shows a first frequency spectrum frame 1000 obtained at a first point in time $T_1$. FIG. 11 shows a second frequency spectrum frame 1100 obtained at a second point in time $T_2$. From these two frames, it can be seen that the frequency components of the voice stream have changed over the time period $T_2 - T_1$ (see dashed lines). Therefore, the frequency spectrum difference will reflect these spectral changes and may represent a transneme.

As part of the frequency spectrum difference calculation, the difference may be compared to a predetermined difference threshold to see if a transneme has occurred. If the frequency spectrum difference is less than or equal to the predetermined difference threshold, the difference may be judged to be essentially zero and the current frequency spectrum frame may be ignored. A next frequency spectrum frame may then be obtained and processed.

The predetermined difference threshold takes into account noise effects and imposes a requirement that the frames must change by at least the predetermined difference threshold in order to be a valid transneme. In one embodiment, the predetermined difference threshold is about 5% of average amplitude of base frequency spectrum bin over a less than 100 millisecond frame size, although the predetermined difference threshold may range from about 3% to about 7%.

A frequency spectrum difference is preferably calculated about every 10 milliseconds due to the average time duration of a phoneme, but may be varied according to conditions or a desired resolution. For example, a frequency spectrum difference may be calculated more often in order to increase the resolution of the transneme differentiation and to potentially increase accuracy. However, the computational workload will increase as a consequence.

Figure 12:
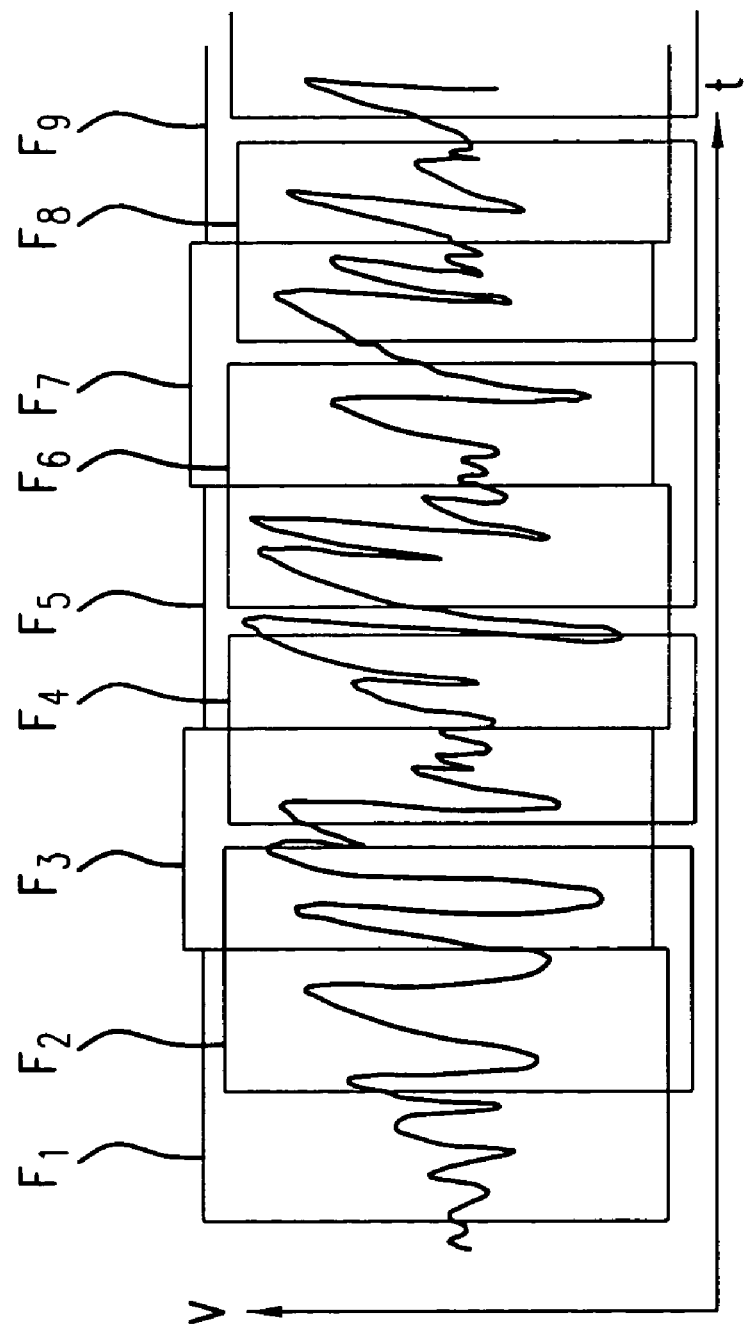
FIG. 12 shows how the frequency domain transformation may be processed using overlapping frequency domain conversion windows.

FIG. 12 shows how the frequency domain transformation may be processed using overlapping frequency domain conversion windows F1, F2, F3, etc. By using overlapping windows, the method ensures that no voice stream data is missed. On the contrary, each data point in the voice stream is preferably processed twice due to the overlap. In addition, the overlap ensures that the analysis of each transneme is more accurate by comparing each voice stream feature to the transneme table 423 more than once.

In step 906, the frequency spectrum difference is mapped to some form of reference in order to determine the transneme that has occurred. The reference will typically be one or more transneme tables or databases, with a predetermined frequency difference mapping to a predetermined transneme. The predetermined frequency spectrum difference may map to more than one predetermined transneme. In use, there may be up to 5 or 10 transnemes in the transneme table 423 that may substantially match the predetermined frequency spectrum difference. An optional size optimization function can be performed to compress that for memory-sensitive applications (at a small expense of processing cycles). A final found transneme may be determined through use of the feature data and by comparison of transneme groupings to the transneme-to-vocabulary database 427. The found transneme or transnemes may be stored and accumulated in the mappings storage 424.

Preferably, the mapping of the frequency spectrum differences may be done using a hash-like vector-distance metric, which finds the best fit difference-to-transneme equivalence. The transneme table 423 may be constructed from experimentally derived transneme data that comprises manually evaluated speech waveforms that are broken down into transnemes. Alternatively, the transneme table 423 may be created by converting existing phoneme data into transnemes.

In step 908, the found transnemes are used to create a voice stream representation in digital form. The found transnemes are preferably processed as groupings, such as a grouping of 10–20 transnemes, for example. After a grouping of transnemes has been accumulated, a free-text-search-like lookup is preferably performed against the transneme-to-vocabulary database 427, using an inverted-index technique to find the best-fit mappings of found transnemes to a word or phrase. Many duplications of words may exist in the transneme-to-vocabulary database 427 in order to accommodate various groupings and usages of words, homonym-decoding, speaker-restarts, etc.

The inverted index is an index into a plurality of text entries, such as a database, for example, that is produced during a text search of the database. The inverted index search result indicates the database entry where the search term may be found and also indicates a location within the text of the matched entry.

For example, consider a simple database (shown in lower case for simplicity) containing four text entries:
I love you
god is love
love is blind
blind justice As an example, a search is performed for each of the words in the database. Using an inverted index search to index the search results by (entry, offset within the entry), the search result indexes returned from the database search might appear as:

| | |
|---|---|
| blind | (3, 8); (4, 0) |
| god | (2, 0) |
| I | (1, 0) |
| is | (2, 4); (3, 5) |

-continued

| | |
|---|---|
| justice | (4, 6) |
| love | (1, 2); (2, 7); (3, 0) |
| you | (1, 7) |

The word "blind" is therefore in database entry 3 ("love is blind"), starting at character 8, and is also in entry 4 ("blind justice"), starting at the first character.

To find documents containing both "is" and "love," the search result indexes are examined to find intersections between the entries. In this case, both entries 2 and 3 contain the two words, so the database entries 2 and 3 both contain the two search terms. Therefore, each entry number of the "is" result may be compared to the "love" result, with an intersection occurring when a database entry number is present in both indexes. In an additional capability, an inverted index search can quickly find documents where the words are physically close by comparing the character offsets of a result having at least one intersecting entry.

The inverted index search technique may be applied to the vocabulary lookup of the transnemes by adding an additional transneme field to each database entry of the transneme-to-vocabulary database 427. The transneme-to-vocabulary database might then have the form:

| Fld1 Doc# | Fld2 Clear Text: | Fld3 Transneme Version |
|---|---|---|
| 1 | "I love you" | 00Ah AhEE EE00 00LL LLUh UhVv VvYY YYoo ooww ww00 |
| 2 | "god is love" | 00Gg GgAh Ahdd ddih ihZZ ZZLL LLUh UhVv Vv00 |
| 3 | "love is blind" | 00LL LLUh UhVv Vvih ihZZ ZZ00 00Bb BbLl LlAh AhEE EENn NnDd Dd00 |
| 4 | "blind justice" | 00Bb BbLl LlAh AhEE EENn NnDd Dd00 00Dj DjUh UhSs Sstt ttih ihss ss00 |

Where

Field 1: Record # (==row number, ==document number)

Field 2: Clear text (in the predetermined verbal language)

Field 3: Transneme version of text

Field 4: Sub-index of each word-to-transneme mapping (optional)

Once candidate transnemes are identified from frequency spectrum differences, they may be used as inverted index query arguments and may be queried against the Field3 transneme version. Therefore, a transneme code or representation obtained from the transneme table 423 may be compared to the transneme versions in the transneme-to-vocabulary database 427 until a match is found. Any database entries which match the query are returned, along with a relative relevance ranking for each result.

The particular word that matched the search term may also be identified in the result field. The word match may be determined from a separate "child" table, or may be determined from an additional field of the same table. For example, the database entry:

1 "I love you" 00Ah AhEE EE00 00LL LLUh UhVv VvYY YYoo ooww ww00 may also be indexed for each transneme-to-word mapping. The transneme-to-vocabulary database 427 might therefore also contain the entries:

| | | |
|---|---|---|
| 5 | "I" | 00Ah AhEE EE00 |
| 6 | "love" | 00LL LLUh UhVv |
| 7 | "you" | YYoo ooww ww00 |

This secondary mapping may be as efficiently done as a post-processing scan of the returned transnemes to identify the word boundaries. The efficiency of the secondary mapping is linked to the number of words in the returned clear text phrases.

After the current grouping of found transnemes has been identified, successive additional iterations may be performed to continue the speech recognition process. At the start of each iteration, the frequency domain conversion window may be advanced. The frequency domain conversion window may be advanced by only a portion of its length, so that a current frequency domain conversion overlaps a previous conversion. In a preferred embodiment, the frequency conversion window is about 10 milliseconds in duration and it is advanced about half a window length. An overlapping lookup is performed against the transneme-to-vocabulary database 427. This may be done in order to ensure that no voice stream data is overlooked and to increase reliability of the analysis through multiple comparisons. The overlapping conversions may also be used to clarify a match, using a context, and may be used to vote for best matches. The overlapping frequency domain conversions may be used to create a listing for a transneme grouping of the search lookups of the transneme-to-vocabulary database 427, with the transneme matches contained in the listing being organized and ranked according to relevance.

Figure 13:
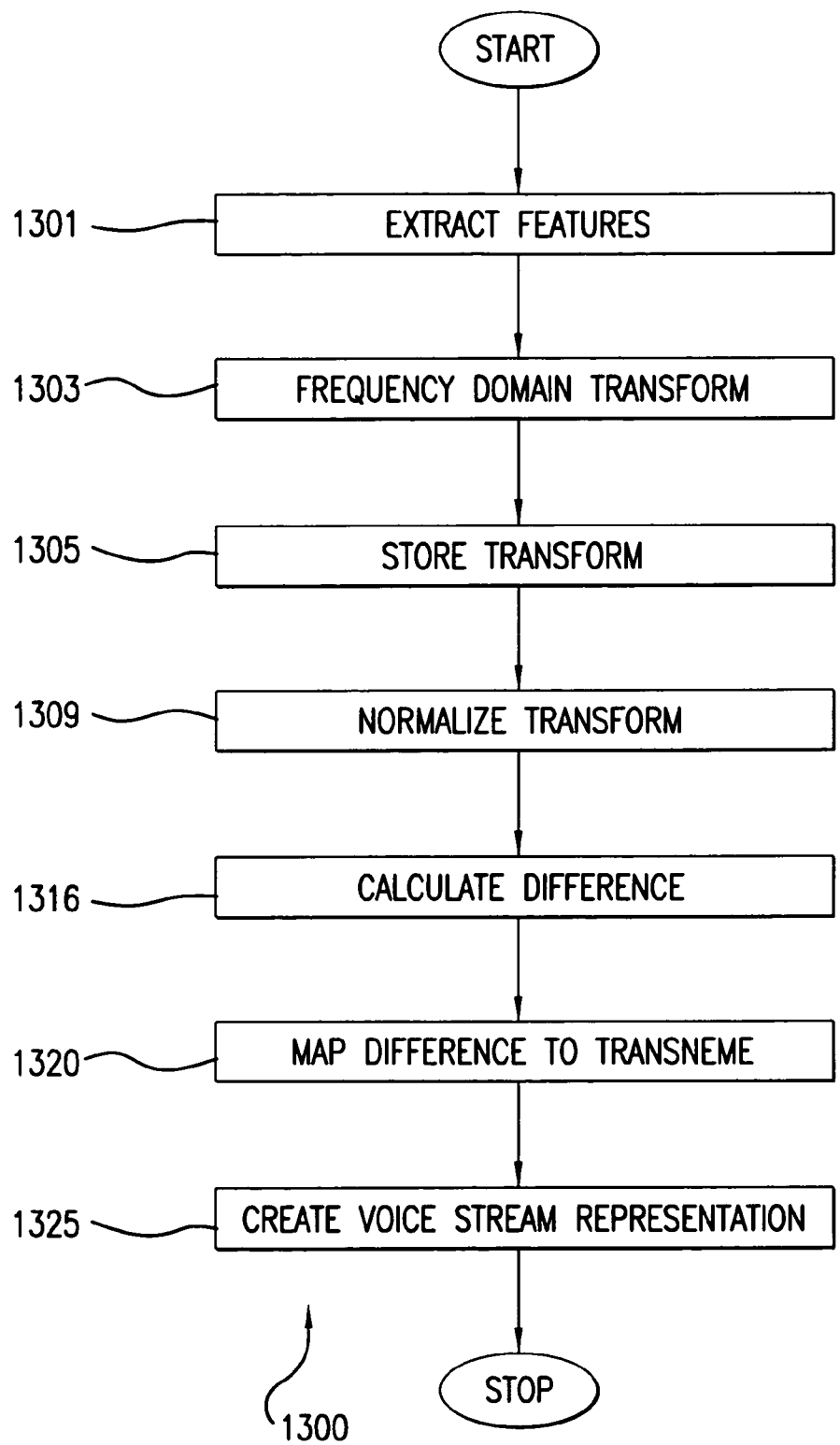
FIG. 13 is a flowchart of a third speech recognition method embodiment.

FIG. 13 is a flowchart 1300 of a third speech recognition method embodiment according to the invention. In step 1301, predetermined features are extracted from the voice stream. The predetermined features may include the volume or amplitude of the voice stream, the pitch (frequency), etc. This feature extraction may be done on a time domain version of the voice stream, before the input voice stream is converted into the frequency domain. Alternatively, the feature extraction may be mathematically extracted from the input voice stream in the frequency domain. For example, in a cellular phone application, a data stream received by the cellular phone may already be in the frequency domain, and the feature extraction may be mathematically performed on the received digital data in order to calculate the volume and the pitch of the speaker.

In step 1303, a frequency domain transformation is performed on the digitized voice stream input to produce the frequency domain output. The output comprises a plurality of frequency band values that represent various frequency components within the voice stream.

The frequency domain transformation may be performed by a FFT device. Alternatively, the frequency domain transformation may be performed by a filter bank comprising a plurality of filters, such as band pass filters. The output of the filter bank is a plurality of frequency band outputs having amplitudes that represent the frequency components within each band.

The frequency domain conversion may be performed for a predetermined time period or window, capturing frequency domain characteristics of the voice stream for a window of time. The frequency domain conversion window is preferably about 10 milliseconds in size. However, this size may be varied, with the size being chosen to accommodate factors such as a desired resolution of the speech. In addition, the language of the speaker may be a factor in choosing the conversion window size. The size of the conversion window must be chosen so as to balance the desired resolution against computational cycles, hardware complexity, etc., because an increase in speech recognition resolution may be accompanied by an increase in computational cycles and/or hardware/memory size.

In step 1305, the frequency domain transformation output is stored. This is preferably done in a plurality of frequency bins, with each bin corresponding to a particular predetermined frequency or frequency band.

In step 1309, the frequency domain outputs are normalized. This may include a frequency normalization and an amplitude normalization, for example. The normalization is performed using speech features that have been extracted from the time domain digitized voice signal. The voice features may include pitch, volume, speech rate, etc. The normalization, therefore, adjusts the values in the frequency bins in order to maintain frequency spectrum frames that are essentially constant (except for frequency components of the voice stream). This accommodates variations in volume and frequency. For example, even if the speaker is speaking very loudly, the overall volume should not matter and should not affect the speech recognition result. Likewise, a change in frequency/pitch by the speaker should not affect the speech recognition.

Figure 14:
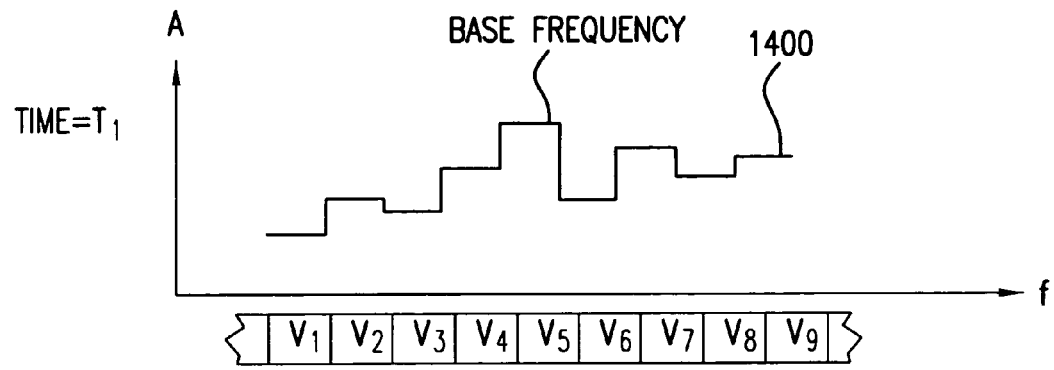
FIGS. 14–16 show a frequency normalization operation on a current frequency spectrum frame.
Figure 15:
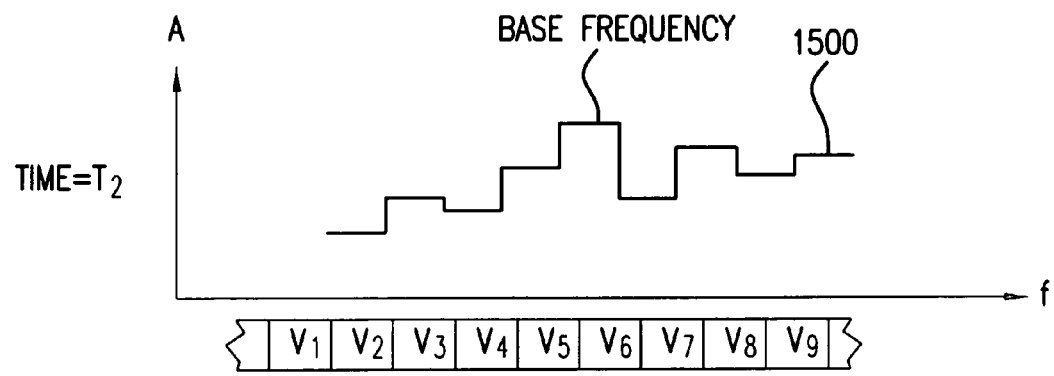
Figure 16:
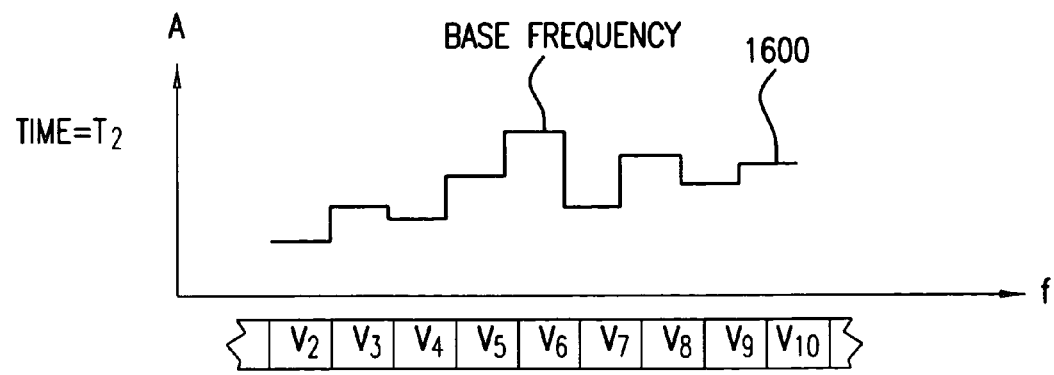

FIGS. 14–16 show a frequency normalization operation on a current frequency spectrum frame. In order to prevent changes in tonality (frequency) from affecting the transneme determination, a base frequency may be used for a frequency normalization. The base frequency is the frequency band (or bin) containing the greatest amplitude (i.e., the largest frequency component of the speech at that time). During frequency normalization, the contents of the frequency bins may be shifted up or down in order to maintain the base frequency in a substantially constant frequency bin location.

FIG. 14 shows a previous frequency spectrum frame 1400 and a frequency bin set containing the corresponding values. FIG. 15 shows a current frequency spectrum frame 1500 and a frequency bin set containing the corresponding values. It can be seen that the base frequency of the current frequency spectrum frame 1500 is higher in frequency (tonality) than the base frequency of the previous frequency spectrum frame 1400. This may be due to various factors, such as emotion or emphasis on the part of the speaker, etc.

FIG. 16 shows a frequency normalization comprising a frequency shift of the current frequency spectrum frame 1500, forming a new current frame 1600. This may be done merely by shifting the values ($V_1$–$V_N$, for example) in the frequency bin set. This may entail dropping one or more values in order to accommodate the shift. A predetermined frequency shift threshold may be used to prevent excessive frequency normalization, allowing only a limited amount of shifting. In addition to normalizing the current frame, the normalization value may be saved and may be used in a word lookup to determine context and punctuation.

Figure 17:
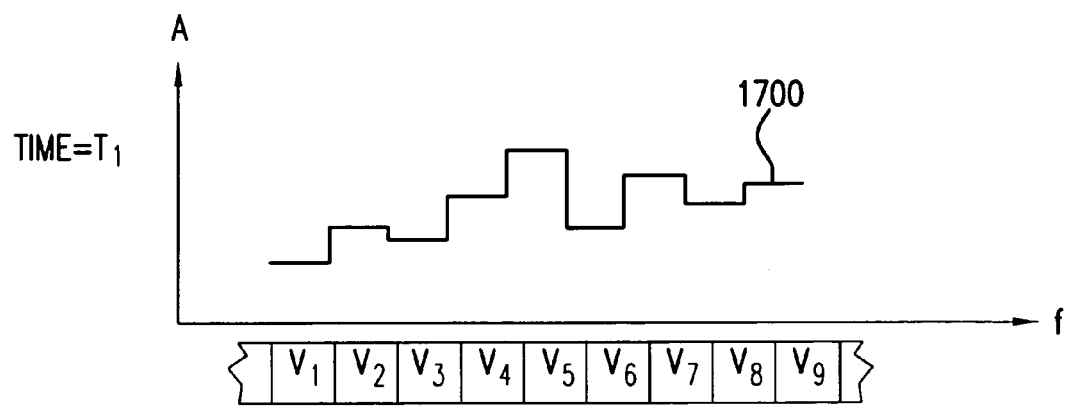
FIGS. 17–18 show an amplitude normalization operation on a current frequency spectrum frame.
Figure 18:
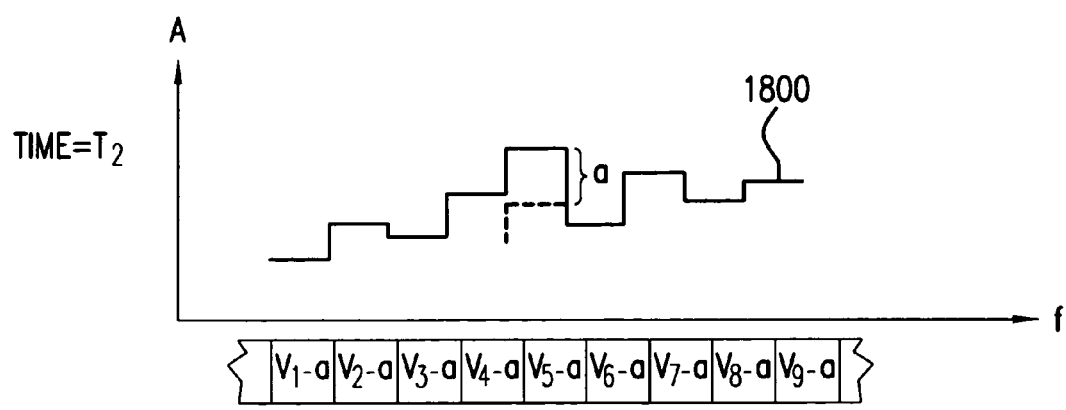

FIGS. 17 and 18 show an amplitude normalization operation on a current frequency spectrum frame. The figures show two successive frequency spectrum frames 1700 and 1800, where the only difference between the frames is an amplitude difference "a". This amplitude difference may be due to a change in volume of the speaker. However, this change in volume could potentially be seen as a transition between phonemes. Therefore, a normalization is desirable so that the speech recognition is essentially independent of the volume of the speaker. The normalization may be accomplished by uniformly increasing or decreasing the values in all of the frequency bins in order to substantially match the amplitude of the previous frequency spectrum frame. In this example, the value "a" is subtracted from all of the frequency spectrum frame values $V_1$–$V_N$ in all of the frequency bins.

In step 1316, a frequency spectrum difference is calculated. As previously discussed, the frequency spectrum difference is calculated between two frequency spectrum frames in order to determine whether a transneme has occurred. The frequency spectrum difference therefore is a set of values that show the difference in frequency components from the current frequency spectrum frame and a previous frequency spectrum frame.

In step 1320, the frequency spectrum difference is mapped to the transneme table 423 (or other reference or database) in order to determine a found transneme.

In step 1325, the transnemes are used to create a voice stream representation in digital form stored within the voice recognition device or computer. The voice stream representation output is a data stream composed of text or digital representations, such as a series of symbols, complete with some suggested punctuation.

While the invention has been described in detail above, the invention is not intended to be limited to the specific embodiments as described. It is evident that those skilled in the art may now make numerous uses and modifications of and departures from the specific embodiments described herein without departing from the inventive concepts.

What is claimed is:

1. A speech recognition device, comprising:
   an I/O device for accepting a voice stream;
   a frequency domain converter communicating with said I/O device, said frequency domain converter converting said voice stream from a time domain to a frequency domain and generating a plurality of frequency domain outputs;
   a frequency domain output storage communicating with said frequency domain converter, said frequency domain output storage comprising at least two frequency spectrum frame storages for storing at least a current frequency spectrum frame and a previous frequency spectrum frame, with a frequency spectrum frame storage of said at least two frequency spectrum frame storages comprising a plurality of frequency bins storing said plurality of frequency domain outputs;
   a processor communicating with said plurality of frequency bins;
   a memory communicating with said processor;
   a frequency spectrum difference storage in said memory, with said frequency spectrum difference storage storing one or more frequency spectrum differences calculated as a difference between said current frequency spectrum frame and said previous frequency spectrum frame;
   at least one feature storage in said memory for storing at least one feature extracted from said voice stream;
   at least one transneme table in said memory, with said at least one transneme table including a plurality of transneme table entries and with a transneme table entry of said plurality of transneme table entries mapping a predetermined frequency spectrum difference to at least one predetermined transneme of a predetermined verbal language;
   at least one mappings storage in said memory, with said at least one mappings storage storing one or more found transnemes;
   at least one transneme-to-vocabulary database in said memory, with said at least one transneme-to-vocabulary database mapping a set of one or more found transnemes to at least one speech unit of said predetermined verbal language; and
   at least one voice stream representation storage in said memory, with said at least one voice stream representation storage storing a voice stream representation created from said one or more found transnemes;
   wherein said speech recognition device calculates a frequency spectrum difference between a current frequency spectrum frame and a previous frequency spectrum frame, maps said frequency spectrum difference to a transneme table, and converts said frequency spectrum difference to a transneme if said frequency spectrum difference is greater than a predetermined difference threshold, and creates a digital voice stream representation of said voice stream from one or more transnemes thus produced.

2. The speech recognition device of claim 1, wherein said voice stream is accepted as a digital voice stream.

3. The speech recognition device of claim 1, wherein said voice stream is compressed.

4. The speech recognition device of claim 1, wherein said I/O device comprises a microphone.

5. The speech recognition device of claim 1, wherein said I/O device comprises a wireless receiver.

6. The speech recognition device of claim 1, wherein said I/O device comprises a digital network interface.

7. The speech recognition device of claim 1, wherein said I/O device comprises an analog network interface.

8. The speech recognition device of claim 1, wherein said frequency domain converter is a Fourier transform device.

9. The speech recognition device of claim 1, wherein said frequency domain converter is a filter bank comprising a plurality of predetermined filters.

10. The speech recognition device of claim 1, wherein said frequency domain output storage is in said memory.

11. The speech recognition device of claim 1, wherein said memory further comprises a feature storage and said processor communicates with said frequency domain output storage and extracts at least one feature from said voice stream in a frequency domain and stores said at least one feature in said feature storage.

12. The speech recognition device of claim 1, wherein said memory further comprises a feature storage and said processor communicates with said I/O device and extracts at least one feature from said voice stream in a time domain and stores said at least one feature in said feature storage.

13. The speech recognition device of claim 1, wherein said frequency domain converter, said frequency domain output storage, said processor, and said memory are included on a digital signal processing (DSP) chip.

14. The speech recognition device of claim 1, wherein said digital voice stream representation comprises a series of symbols.

15. The speech recognition device of claim 1, wherein said digital voice stream representation comprises a series of text symbols.

16. The speech recognition device of claim 1, wherein said speech recognition device converts and compresses said voice stream into a compressed digital voice stream representation comprising a series of symbols.

17. The speech recognition device of claim 1, wherein said speech recognition device converts and compresses said voice stream into a compressed digital voice stream representation and transmits said compressed digital voice stream representation as a series of symbols.

18. The speech recognition device of claim 1, wherein said speech recognition device converts and compresses said voice stream into a compressed digital voice stream representation and stores said compressed digital voice stream representation as a series of symbols.

19. A method for performing speech recognition on a voice stream, comprising the steps of:
   determining one or more candidate transnemes in said voice stream;
   mapping said one or more candidate transnemes to a transneme table to convert said one or more candidate transnemes to one or more found transnemes; and
   mapping said one or more found transnemes to a transneme-to-vocabulary database to convert said one or more found transnemes to one or more speech units.

20. The method of claim 19, wherein said one or more speech units are combined to create a digital voice stream representation of said voice stream.

21. The method of claim 19, wherein said one or more speech units are combined to create a digital voice stream representation of said voice stream, with said digital voice stream representation comprising a series of symbols.

22. The method of claim 19, wherein said one or more speech units are combined to create a digital voice stream representation of said voice stream, with said digital voice stream representation comprising a series of text symbols.

23. The method of claim 19, with said determining step further comprising comparing at least two frequency spectrum frames in a frequency domain in order to determine said one or more candidate transnemes.

24. The method of claim 19, wherein said voice stream is compressed by said method into a compressed digital voice stream representation comprising a series of symbols.

25. The method of claim 19, wherein said voice stream is compressed by said method into a compressed digital voice stream representation and wherein said method further comprises a step of transmitting said compressed digital voice stream representation as a series of symbols.

26. The method of claim 19, wherein said voice stream is compressed by said method into a compressed digital voice stream representation and wherein said method further comprises a step of storing said compressed digital voice stream representation as a series of symbols.

27. The method of claim 19, wherein a voice stream in a first verbal language is converted into a voice stream representation in a second language.

28. A method for performing speech recognition on a voice stream, comprising the steps of:
   calculating a frequency spectrum difference between a current frequency spectrum frame and a previous frequency spectrum frame, with said current frequency spectrum frame and said previous frequency spectrum frame being in a frequency domain and being separated by a predetermined time interval; and
   mapping said frequency spectrum difference to a transneme table to convert said frequency spectrum difference to at least one transneme if said frequency spectrum difference is greater than a predetermined difference threshold;
   wherein a digital voice stream representation of said voice stream is created from one or more transnemes thus produced.

29. The method of claim 28, further including the steps of:
   saving tonality level changes of said voice stream; and
   using said tonality level changes to add punctuation to said voice stream representation.

30. The method of claim 28, wherein at least one feature is extracted from said voice stream in a time domain.

31. The method of claim 28, wherein at least one feature is mathematically extracted from said voice stream in a frequency domain.

32. The method of claim 28, wherein at least one feature is mathematically extracted from said voice stream in a frequency domain, and wherein said voice stream is a compressed voice stream already in said frequency domain.

33. The method of claim 28, further comprising the steps of:
   performing a frequency domain transformation on said voice stream upon a predetermined time interval to create said current frequency spectrum frame;
   storing said current frequency spectrum frame in a plurality of frequency bins; and
   amplitude shifting and frequency shifting said current frequency spectrum frame based on a comparison of a current base frequency of said current frequency spectrum frame to a previous base frequency of a previous frequency spectrum frame.

34. The method of claim 28, wherein said predetermined time interval is less than a phoneme in length.

35. The method of claim 28, wherein said predetermined time interval is about ten milliseconds.

36. The method of claim 28, wherein said predetermined difference threshold is about 5% of average amplitude of a base frequency bin over a window of less than 100 milliseconds.

37. The method of claim 28, further comprising the steps of:
   accumulating a predetermined number of transnemes;
   performing a lookup of said predetermined number of transnemes against a transneme-to-vocabulary database; and
   matching at least one transneme in said predetermined number of transnemes to at least one speech unit in said transneme-to-vocabulary database.

38. The method of claim 37 wherein about ten to about twenty transnemes are accumulated in said predetermined number of transnemes for performing said lookup against said transneme-to-vocabulary database.

39. The method of claim 37, with the step of performing a lookup against a transneme-to-vocabulary database further comprising performing a free-text-search lookup of said predetermined number of transnemes against said transneme-to-vocabulary database using inverted-index techniques in order to find one or more best-fit mappings of a segment of transnemes in said predetermined number of transnemes to at least one speech unit in said transneme-to-vocabulary database.

40. The method of claim 28, wherein said digital voice stream representation comprises a series of symbols.

41. The method of claim 28, wherein said digital voice stream representation comprises a series of text symbols.

42. The method of claim 28, wherein said voice stream is compressed into a compressed digital voice stream representation comprising a series of symbols.

43. The method of claim 28, wherein said voice stream is compressed by said method into a compressed digital voice stream representation and wherein said method further comprises a step of transmitting said compressed digital voice stream representation as a series of symbols.

44. The method of claim 28, wherein said voice stream is compressed by said method into a compressed digital voice stream representation and wherein said method further comprises a step of storing said compressed digital voice stream representation as a series of symbols.

45. The method of claim 28, wherein a voice stream in a first verbal language is converted into a voice stream representation in a second language.

46. A method for performing speech recognition on a voice stream, comprising the steps of:
performing a frequency domain transformation on said voice stream upon a predetermined time interval to create a current frequency spectrum frame;
normalizing said current frequency spectrum frame;
calculating a frequency spectrum difference between said current frequency spectrum frame and a previous frequency spectrum frame;
mapping said frequency spectrum difference to a transneme table to convert said frequency spectrum difference to at least one found transneme if said frequency spectrum difference is greater than a predetermined difference threshold; and
creating a digital voice stream representation of said voice stream from one or more found transnemes thus produced.

47. The method of claim 46, further including the steps of:
saving tonality level changes of said voice stream; and
using said tonality level changes to add punctuation to said voice stream representation.

48. The method of claim 46, wherein at least one feature is extracted from said voice stream in a time domain.

49. The method of claim 46, wherein at least one feature is mathematically extracted from said voice stream in a frequency domain.

50. The method of claim 46, wherein at least one feature is mathematically extracted from said voice stream in a frequency domain, and wherein said voice stream is a compressed voice stream already in said frequency domain.

51. The method of claim 46, with said step of performing a frequency domain transformation comprising performing time-overlapping frequency domain transformations.

52. The method of claim 46, with said step of performing a frequency domain transformation comprising performing a Fourier transformation.

53. The method of claim 46, with said step of performing a frequency domain transformation comprising performing time-overlapping frequency domain transformations of a predetermined transformation window about every 5 milliseconds.

54. The method of claim 46, with said step of performing a frequency domain transformation comprising performing time-overlapping frequency domain transformations of an about 10 millisecond transformation window about every 5 milliseconds.

55. The method of claim 46, further comprising the step of storing said current frequency spectrum frame in a plurality of current frequency bins.

56. The method of claim 46, with said step of normalizing comprising normalizing a base frequency of said current frequency spectrum frame to a base frequency of said previous frequency spectrum frame.

57. The method of claim 46, with said step of normalizing comprising frequency shifting said current frequency spectrum frame using an extracted pitch feature.

58. The method of claim 46, with said step of normalizing comprising amplitude shifting said current frequency spectrum frame using an extracted volume feature.

59. The method of claim 46, with said step of normalizing comprising amplitude shifting and frequency shifting said current frequency spectrum frame based on a comparison of a current base frequency of said current frequency spectrum frame to a previous base frequency of said previous frequency spectrum frame.

60. The method of claim 46, further comprising the step of storing said current frequency spectrum frame in a plurality of current frequency bins and with said step of calculating said frequency spectrum difference comprising calculating a plurality of difference values between a plurality of current frequency spectrum frame bin values in said plurality of current frequency bins and a plurality of previous frequency spectrum frame bin values.

61. The method of claim 46, wherein said predetermined time interval is less than a phoneme in length.

62. The method of claim 46, wherein said predetermined time interval is about ten milliseconds.

63. The method of claim 46, wherein said predetermined threshold is about 5% of average amplitude of a base frequency bin over a window of less than 100 milliseconds.

64. The method of claim 46, further comprising the steps of:
accumulating a predetermined number of transnemes;
performing a lookup of said predetermined number of transnemes against a transneme-to-vocabulary database; and
matching at least one transneme in said predetermined number of transnemes to at least one speech unit in said transneme-to-vocabulary database.

65. The method of claim 64, wherein about ten to about twenty transnemes are accumulated in said predetermined number of transnemes for performing said lookup against said transneme-to-vocabulary database.

66. The method of claim 64 with the step of performing a lookup against a transneme-to-vocabulary database further comprising performing a free-text-search lookup of said predetermined number of transnemes against said transneme-to-vocabulary database using inverted-index techniques in order to find one or more best-fit mappings of a segment of transnemes in said predetermined number of transnemes to at least one speech unit in said transneme-to-vocabulary database.

67. The method of claim 46, wherein said digital voice stream representation comprises a series of symbols.

68. The method of claim 46, wherein said digital voice stream representation comprises a series of text symbols.

69. The method of claim 46, wherein said voice stream is compressed into a compressed digital voice stream representation comprising a series of symbols.

70. The method of claim 46, wherein said voice stream is compressed by said method into a compressed digital voice stream representation and wherein said method further comprises a step of transmitting said compressed digital voice stream representation as a series of symbols.

71. The method of claim 46, wherein said voice stream is compressed by said method into a compressed digital voice stream representation and wherein said method further comprises a step of storing said compressed digital voice stream representation as a series of symbols.

72. The method of claim 46, wherein a voice stream in a first verbal language is converted into a voice stream representation in a second language.

73. A speech recognition device, comprising:
an input transducer that converts audible speech into a voice stream signal;

a transneme database;

a transneme-to-vocabulary database; and at least one processor that extracts one or more candidate transnemes from said voice stream signal, maps said one or more candidate transnemes to said transneme database to convert said one or more candidate transnemes to one or more found transnemes, and maps said one or more found transnemes to said transneme-to-vocabulary database to convert said one or more found transnemes to one or more speech units;

whereby a continuous voice stream signal obtained from continuous audible speech is converted into a sequence of speech units that together constitute at least one word.

* * * * *